Nov. 29, 1949  F. W. SAMPSON ET AL  2,489,503
MACHINE FOR MAKING TUBING
Filed Oct. 7, 1948  2 Sheets-Sheet 1

INVENTORS
FREDERICK W. SAMPSON
& EDWARD P. HARRIS
their ATTORNEYS

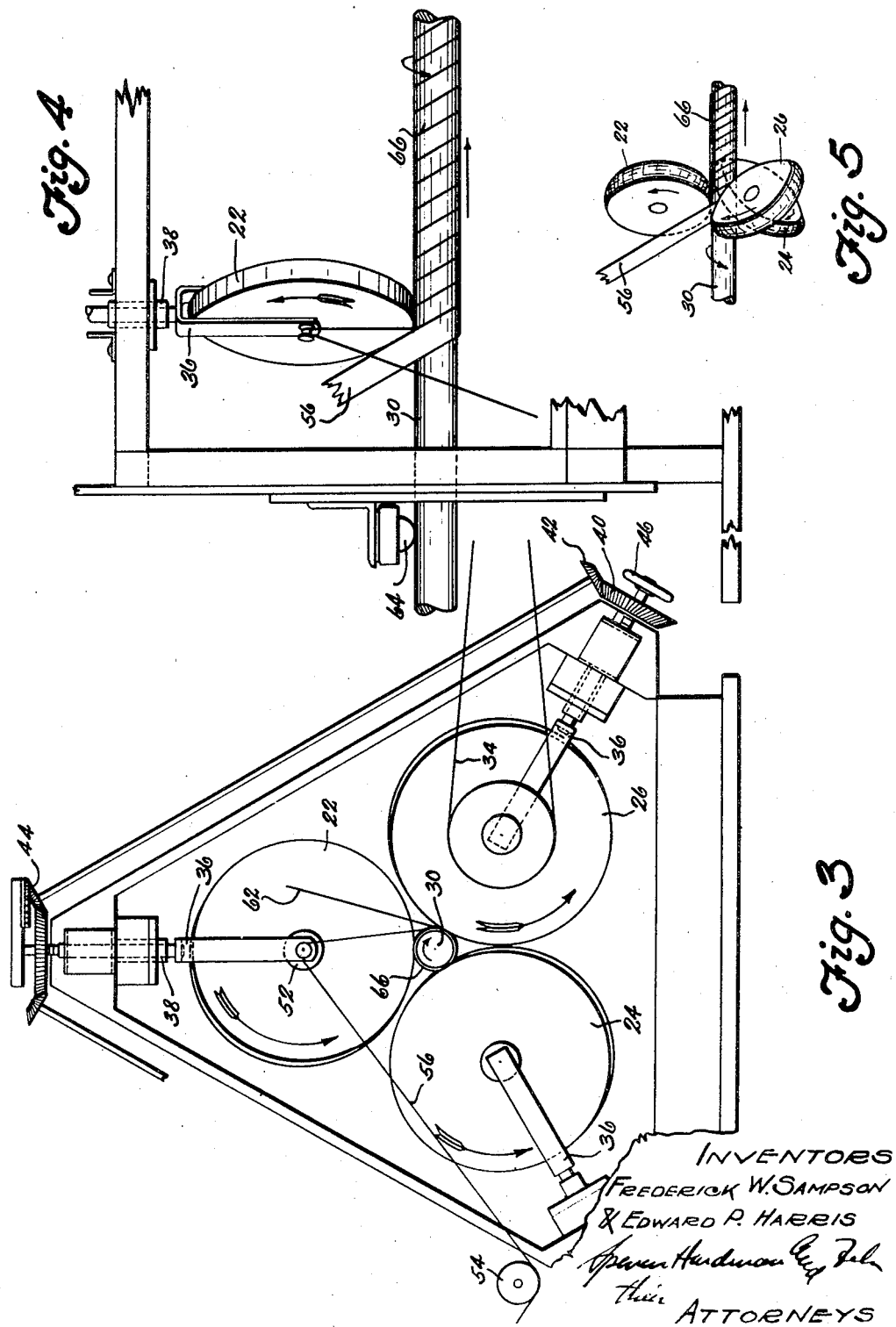

Patented Nov. 29, 1949

2,489,503

UNITED STATES PATENT OFFICE 2,489,503

MACHINE FOR MAKING TUBING

Frederick W. Sampson and Edward P. Harris, Dayton, Ohio, assignors to General Motors Corporation, Detroit, Mich., a corporation of Delaware Application October 7, 1948, Serial No. 53,348

6 Claims. (Cl. 154—6)

This invention relates to flexible reenforced tubing and is particularly concerned with an apparatus for making such tubing.

It is, therefore, the primary object of the invention to provide a new type of apparatus for making flexible reenforced tubing which includes a plurality of wheels through which the tubing and the tubing mandrel pass, said wheels being simultaneously adjustable so that their axes are angled from the axis of the mandrel whereby the wheels drive the mandrel longitudinally thereof and simultaneously press the tubing material together and against the mandrel.

Another object of the invention is to provide a machine for making flexible tubing which includes a wire reenforcement that is helically wound and which is covered by means of a vulcanizable tape whereby the wire is integrated within the tubing.

In carrying out the above object it is a further object to provide a machine wherein a pressure roll or wheel is utilized for pressing the wire into the tape and for simultaneously moving the integrated tubing substantially axially of the roll.

Another object of the invention is to provide a machine for making tubing including a wire reenforcement therein which is adjustable during its operation so that the pitch of the wire reenforcement may be changed at will to provide reenforced portions on given lengths of tubing.

Further objects and advantages of the present invention will be apparent from the following description, reference being had to the accompanying drawings wherein a preferred embodiment of the present invention is clearly shown.

In the drawings:

Fig. 3 is a plan view of the machine shown in Fig. 1 including one means of adjusting the rolls or wheels so that they are all angled identically.

Fig. 4 is a fragmentary side view of the machine shown in Fig. 3, wherein the mandrel, etc., as shown with only one of the rolls being illustrated; and Fig. 5 is a fragmentary view on an exaggerated scale of the rolls and mandrel to illustrate the means for driving the mandrel axially thereof.

In the manufacture of flexible tubing, such as is used for defroster hose, vacuum cleaner hose and air hose of various types, a fabric tape is generally used which is coated with a vulcanizable rubberlike material, which tape is wound spirally around a mandrel, coated with talc or other lubricant whereupon the mandrel is placed in a retort and the rubberlike material vulcanized after which the length of the tubing may be removed from the mandrel. In many cases, a helical wire reenforcement is included in the tubing to prevent collapse thereof when the tubing is bent. This wire reenforcement is disposed on the inside of the tubing and during the vulcanizing step is bonded or partially bonded to the tubing. Due to obvious reasons it is most desirable to cover the wire reenforcement and have it completely covered with the fabric within the tubing rather than merely using the wire as a skelton inside of the tubing. Such a type of tubing, however, is difficult to manufacture due to critical spacing and the like of the wire and the tape.

These difficulties arise from the fact that in the past tubing manufacture was carried out on a mandrel which was rotated by holding one end thereof in a chuck or like device and then by winding the tape and wire spirally therearound while advancing the feeding spools for both of these materials. It is obvious that such an apparatus is difficult to control in production.

Figure 1:
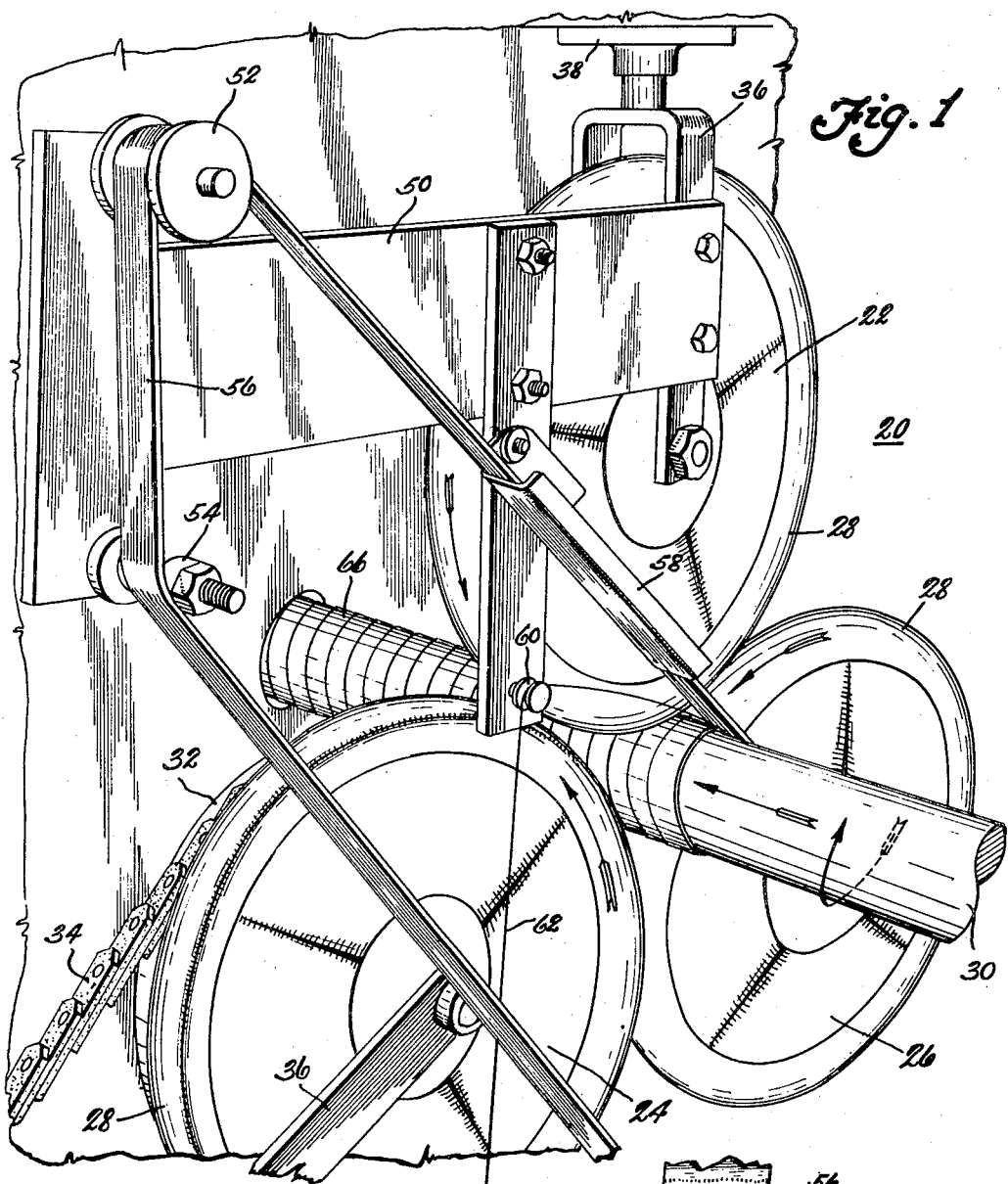
Fig. 1 is a fragmentary view in perspective showing the main portion of the machine together with a mandrel having tubing partially formed thereon.
Figure 2:
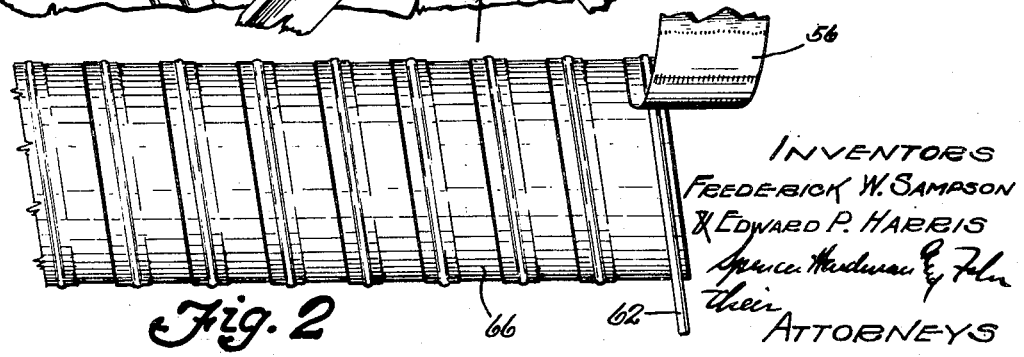
Fig. 2 is a view of a portion of the tubing formed on the machine showing the overlapping of the tape reenforced with the wire.

The present invention is directed to a simplified machine for making wire reenforced fabric tubing which is not only simple in its operation and construction but which provides an accurate means for forming the tubing. Such a machine is shown in perspective in Fig. 1 at 20. The machine 20 includes three rolls or wheels 22, 24 and 26, preferably having a rubber tire or tread thereon as noted at 28. These wheels are preferably spaced equally at 120° from each other. The spacing between the tread of the wheels, as shown in Fig. 3, is of sufficient size to permit passage of a mandrel 30 therethrough with the treads of the wheels pressing against the mandrel. The wheel 24 may be termed the driving wheel and is provided with a pulley 32 which is connected by a belt 34 to a power source, not shown. If more than one driving wheel is desired similar pulleys, belts and power means may be provided. However, in practice we have found that a single driving wheel is sufficient. The wheels are all supported by means of bifurcated supports 36 which are journaled in bearings 38 and which as shown in Fig. 3 are geared together or otherwise connected so that any turning of one wheel with respect to the axis thereof, whereby the axis is thrown out of alignment with the axis of the mandrel, will be accompanied by a similar turning of the other wheels. One means of accomplishing this end is shown in Fig. 3 wherein gears 40, 42, 44, etc. are provided, which gears are all controlled through handwheel adjustment 46. Obviously the same end may be accomplished through means of levers or for that matter the wheels may be separately angled and locked in position although such manipulation is more difficult to accomplish. In any event the wheels are adjustable axially of the mandrel and this adjustment is a factor of primary importance in connection with the apparatus. It will be noted in the exaggerated view (Fig. 5) that when the wheels are turned and one of the wheels is driven, such as wheel 24, that the mandrel will advance axially. Obviously, if the wheel 24 had its axis at right angle to the axis of the mandrel this advance would be more rapid. Also by reversing the direction of rotation of the wheel the direction of travel of the mandrel can be reversed. By regulating the angularity of the driving wheel 24 and the follower wheels 22 and 26 it is possible to obtain any speed of advancement, compatible with the driving mechanism or motor. Usually this angularity is not extreme since, as will be explained hereinafter, the helix angle of the reenforcement is dependent upon the angularity of the driving wheel 24. In order to obtain this angularity of tape and wire a carrier 50 is provided attached to one of the bifurcated supports 36 and as shown in Fig. 1, which carries wheel 22. This carrier includes rollers 52 and 54 which direct the tape 56 that is supplied from a roll, not shown. The tape 56 passes from roller 52 through a guide chute 58 and on to the mandrel. Another guide means 60 is also provided on support 50 which means 60 guides the wire 62 which is supplied from a spool, not shown. By properly adjusting the guide 60 with respect to the chute 58 the wire may be interposed very readily between the overlap of the tape as shown in Fig. 2 and without any discrepancies during the operation of the machine. In other words, the disposition of the wire is no longer critical and if the angularity of the wheel 24 is changed, the angularity of the support 50 is simultaneously changed the same amount so that the adjustment between the feed of the tape and wire is always constant so far as the overlap is concerned.

The mandrel 30 is supported on the incoming end by means of rollers 64 preferably three in number and as it leaves the machine with the tubing 66 formed thereon it may pass directly to a retort for vulcanization of the tape.

The adjustment of the angularity of the wheels 22, 24 and 26 is of prime importance as stated before. This adjustment permits various conditions to be controlled. For example, in many defroster hoses it is desirable to have reenforced end portions; if in use the hose is to be three feet long, for example, it is desirable to have the end portions thereof heavily reenforced so that they may be slipped over a tube and so that these end portions will be finished in the manufacture of the tubing. In the past, the tubing has merely been cut to length with the same helix angle throughout on the reenforced wire. In the present instance, it is possible to automatically control the angularity of the wheels in the machine 20 so that the angularity is very slight at the start of the operation whereby the wire and tape are wrapped very close at the start, whereupon the pitch may be changed during the operation to provide a greater helix angle and then when a certain number of feet of tubing has been made the angularity again may be cut down so that a reenforced portion appears in the tubing etc. In this manner after the tubing has been vulcanized it may be cut through these reenforced portions whereby heavy sections are provided at the ends of specific lengths of tubing. This type of tubing has never before been possible to make except by hand operations and then the uniformity thereof has varied tremendously.

The tape 56 which is used, is the usual type of fabric tape having a rubberlike coating preferably on one side only thereof which is vulcanizable. This coating may be the usual synthetic rubbers which include the butadiene styrene copolymers, butadiene acrylonitrile copolymers, polychloroprene or it may be natural rubber or, in some instances, vinyl compounds. In fact, the particular coating on the fabric is not of importance here since the machine itself will operate properly regardless of the type of tape or tape coating used. Also the vulcanizing process or bonding process is not of importance since this step is well known in the art. The invention here resides entirely in a machine including wheels or rollers which are angled to provide a definite longitudinal feed of the mandrel upon which the tubing is formed. These rollers have the added function of acting as pressing means for forcing the tape together as it overlaps whereby the wire reenforcement is enveloped by the overlapping portion. It is apparent that if any of the types of tubing are desired to be made where the wire reenforcement is not enveloped that this tubing may be accomplished by the use of the instant machine. In other words, the machine is not limited to any particular type of tubing but may be adjusted to make any of the conventional types of reenforced tubings known today by slight modification in the point of feed of the wire, tape, etc. All of these factors may be accomplished by any one skilled in the art.

Various modifications in the design are also in the scope of the invention herein, for example, wheels may include springs for pressing them against the mandrel whereby a different type of tread may be utilized, if desired. In all cases, however, the wheels may be resiliently pressed against the mandrel. Also, when manufacturing large diameter tubing with a heavy mandrel it may be desirable to use two or three sets of wheels all preferably interlocked for identical angling. In this case the tape feed is usually only provided on the first set of wheels. However, if a thick walled tubing is desired, it is possible to include tape feeding devices on all sets of wheels for any specific purpose. It should also be pointed out here that the machine will function and form satisfactory tubing if only the driving wheel is angled. In this instance if the feed mechanism is carried by the driving wheel, satisfactory tape may be produced. However, it is apparent that the follower wheels will have to slip longitudinally and such slipping is not desirable. Similarly the angles of all of the wheels do not have the same angle although this latter condition is preferred since there will be no slip between the wheels and mandrel if the angles are all the same.

While the embodiment of the present invention as herein disclosed constitutes a preferred form it is to be understood that other forms might be adopted.

What is claimed is as follows:

1. A tubing machine including a tubing mandrel for making wire reenforced tubing, comprising in combination; three substantially equally, radially displaced rollers disposed with their axes parallel to the axis of the tubing mandrel, feed means for tape and wire, driving means for causing rotation of at least one of said rolls, and means for angling said driven roll so that its axis is out of parallelism with the axis of the mandrel whereby the degree of the angle causes lateral travel of the mandrel between said rolls, said angling means simultaneously adjusting the angle of the feed means so as to cause a spiral wrapping of the wire and tape in predetermined spaced relation for forming a tube on the mandrel.

2. A tubing machine including a tubing mandrel, for making wire reenforced tubing, comprising in combination; three substantially equally, radially displaced rollers disposed with their axes parallel to the axis of the tubing mandrel, feed means for tape and wire carried by one of said rolls, driving means for causing rotation of at least one of said rolls, means for angling said driven roll so that its axis is out of parallelism with the axis of the mandrel whereby the degree of the angle causes lateral travel of the mandrel between said rolls, said angling simultaneously causing a spiral wrapping of the wire and tape to form a tube on said mandrel and means for intermittently changing the angle of said driven roll after a predetermined length of the tubing has been made whereby a reenforced section may be formed in the tubing.

3. A tubing machine including a tubing mandrel of the desired diameter for making wire reenforced wrapped tubing comprising in combination; at least three rolls having resilient treads thereon and normally disposed on their axes parallel to the axis of the tubing mandrel, said rolls being substantially uniformly spaced radially wherein the circumference of the axes thereof is such as to leave a space between the treads but slightly less than the diameter of the mandrel whereby the tread of the rolls presses upon the mandrel when the mandrel is therebetween, means for driving at least one of said rolls, means for supplying tape and wire to said mandrel to be wrapped thereon, and means for angling said driven roll out of parallelism with said mandrel whereby the angle of the roll determines the speed of travel of the mandrel being driven thereby, said angling means simultaneously angling the means for supplying tape and wire to the mandrel whereby the spiral wrapping of the tape and wire is controlled concomitantly with the angle of the driving roll.

4. A tubing machine for making tubing comprising in combination a tubing mandrel having a diameter substantially equal to the desired inner diameter of the tubing, three rolls disposed with their axes approximately 120° apart and around said mandrel and normally having their axes parallel to the axis of the mandrel, said rolls being so spaced as to bear upon the mandrel with appreciable pressure, means for driving at least one of said rolls so that the rotation thereof is transmitted to the mandrel, means for changing the position of the axis of said driven roll so that said axis is out of parallelism with the axis of the mandrel whereby the roll when driven causes the mandrel to move laterally thereof, means for feeding tubing materials to the mandrel, said means being associated with the driving roll in such a manner as to be spirally adjusted simultaneously therewith whereby said tubing material forms a spiral covering on said mandrel, the pitch of which is determined by the angle of the feed.

5. A tubing machine for making tubing comprising in combination a tubing mandrel having a diameter substantially equal to the desired inner diameter of the tubing to be made, three rolls disposed with their axes 120° apart and around said mandrel and normally having their axes parallel to the axis of the mandrel, said rolls being so spaced as to bear upon the mandrel with appreciable pressure, means for driving at least one of said rolls so that the rotation thereof is transmitted to the mandrel, means for changing the position of the axis of said driven roll so that said axis is out of parallelism with the axis of the mandrel whereby the roll when driven causes the mandrel to move laterally thereto, means for feeding tubing materials to the mandrel, said means being associated with the driving roll in such a manner as to be spirally adjusted simultaneously therewith whereby said tubing material forms a spiral covering on said mandrel the pitch of which is determined by the angle of the feed, and means for changing the feed angle and the driven roll angle at predetermined times in the operation of the machine whereby the tubing formed is of a different weight at predetermined points thereon as occasioned by the change in the spiral of the tube-forming material.

6. A tubing machine for making wire reenforced tubing comprising in combination; a mandrel having a diameter substantially equal to the inside diameter of the tubing to be made, at least three substantially equally radially spaced rollers disposed around said mandrel and adapted to press against the same, means for driving one of said rollers, at least said roller being disposed so that the axis thereof is out of parallelism with the axis of said mandrel so that upon rotation thereof, the mandrel is rotated and also moved axially, means for feeding tape and wire to said mandrel, said means being angled at substantially the same pitch as said roller so as to cause a spiral wrapping of the wire and tape in predetermined spaced relation upon said mandrel for forming a tube thereon.

FREDERICK W. SAMPSON.
EDWARD P. HARRIS.

REFERENCES CITED

The following references are of record in the file of this patent:

UNITED STATES PATENTS

| Number | Name | Date |
|---|---|---|
| 931,134 | Lutz | Aug. 17, 1909 |
| 1,024,604 | Sill | Apr. 30, 1912 |
| 2,048,360 | Spanel et al. | July 21, 1936 |
| 2,245,758 | Chernack | June 17, 1941 |
| 2,366,087 | Chernack | Dec. 26, 1944 |